United States Patent [19]

McIlroy

[11] 3,995,888
[45] Dec. 7, 1976

[54] FLEXIBLE PIPE CONNECTOR

[76] Inventor: John C. McIlroy, 906 Baldwin, Lapeer, Mich. 48446

[22] Filed: Apr. 21, 1975

[21] Appl. No.: 570,159

Related U.S. Application Data

[63] Continuation-in-part of Ser. No. 358,996, May 10, 1973, Pat. No. 3,908,208.

[52] U.S. Cl. .................................. 285/4; 285/93; 285/177; 285/179; 285/253
[51] Int. Cl.² .................. F16L 25/00; F16L 43/00
[58] Field of Search ............ 285/4, 3, 93, 177, 236, 285/179, 157, 253, 334.4; 4/207, DIG. 7, DIG. 13, DIG. 16

[56] References Cited
UNITED STATES PATENTS

| | | | |
|---|---|---|---|
| 1,258,884 | 3/1918 | Fife | 285/4 |
| 1,558,503 | 10/1925 | Pressler | 285/4 X |
| 2,025,067 | 12/1935 | Miller | 285/177 |
| 2,449,754 | 9/1948 | Seitz | 285/4 |
| 2,966,372 | 12/1960 | Phillips | 285/179 X |
| 3,349,805 | 10/1967 | Fried | 285/177 X |
| 3,365,218 | 1/1968 | Denyes | 285/253 |
| 3,378,282 | 4/1968 | Demler | 285/236 X |
| 3,598,157 | 8/1971 | Farr | 285/4 X |
| 3,841,668 | 10/1974 | Williams | 285/93 |
| 3,860,978 | 1/1975 | Wirth | 285/157 |

FOREIGN PATENTS OR APPLICATIONS

| | | | |
|---|---|---|---|
| 1,163,414 | 9/1969 | United Kingdom | 285/177 |

*Primary Examiner*—Thomas F. Callaghan
*Attorney, Agent, or Firm*—Harry R. Dumont

[57] ABSTRACT

The pipe connector is fabricated from a deflectible type of plastic material and may be easily removed and cleaned when this is necessary. Both the initial construction of the plumbing system and the subsequent removal and repair are facilitated by the specialized construction of the two free ends of the bend portion, each of which has associated with it a resilient clamp which is loosened or tightened through the operation of an associated threaded fastener. The material from which the connector is fabricated is preferably a high density polyprophylene of the clear or transparent type which admits light and permits the homeowner or plumber to inspect the plumbing system and to readily determine whether removal and cleaning is necessary.

4 Claims, 3 Drawing Figures

FLEXIBLE PIPE CONNECTOR

REFERENCE TO RELATED APPLICATION

This application is a continuation-in-part of my U.S. patent application Ser. No. 358,996 filed May 10, 1973 for "Quick Release Safety Trap" issued on Sept. 30, 1975 as U.S. Pat. No. 3,908,208.

BACKGROUND OF THE INVENTION

The present invention relates to an improvement in pipe connectors and is adapted for use with plumbing systems including pipe made of copper, brass, lead, steel or plastic. In the initial construction of the plumbing system, pipe ends for either carrying in water or carrying out waste are typically threaded and the pipe couplings used are likewise threaded so that the juncture is made. In addition, pipes being joined intersect at different angles so that a number of different angular bends are required for the connectors, either in their off-the-shelf condition or as they are fabricated and bent on the site by skilled plumbers. Over a prolonged period of use where the pipes have been joined by metallic connectors, there occur both corrosion and strains. The strains are caused by cutting, threading and joining pipes and by subsequent expansion and contraction of the water lines. Since all waters and soils tend to corrode the pipe, the corrosion action occurs and is particularly noticeable at threaded joints in the pipe. The results are red water, reduced flow capacity and shortened life of the entire plumbing system. Indeed, the bore of the pipes, particularly where the metallic couplings are connected, may become clogged or finally closed with a rusty coating or deposit long before the wall of the pipe itself has been subjected to any destruction.

It is well known that pipes of iron have relatively rough interiors which serve to retard the flow of water, while brass and copper pipes on the other hand have smooth interiors which allows for a greater flow of water over a long period. Even in the preferred types of pipes, it is necessary that they be cut with some precision and then threaded prior to installation of the couplings between pipes. A further weakness inherent in any threaded pipe is that the end portions which have been threaded are subject to strain lines which later may develop into fracture lines and leakage to the pipe.

With pipe connectors according to the present invention, it is possible to provide a relatively small number of different angular connectors which, because of their deflectible nature, will cover a broad range of angular requirements. The connection of the pipes can be made without requiring the high degree of skilled labor now required for plumbing installation in that the connector itself is of an adjustable length by reason of the segmented sections and once the pipes to be joined are in place the joining may be completed simply through a C-clamp attachment used in conjunction with the present invention.

Thus, it will be seen that the present invention allows for a strong and permanently water-tight joint without requiring placing unusual strain on the piping at any point. The physical strength of the pipe and the connector is greatly increased since there is required no threading in which the metal is cut away, leaving a pipe much thinner at the thread roots and subject to breakage and to later leaking.

A second outstanding advantage of the present invention is that once the system has been assembled and put in use it is possible to periodically check the joints and determine whether or not any clogging is beginning. Once the connector has been removed in a typical metal connector installation, it is necessary to rejoin the elements and to make a second leakproof connection with caulking, solder or the like. Even in return lines where the fluid pressure drop is relatively low, it is necessary to achieve a tight connection either through relatively complicated bell and spigot-type joints, flanged joints, or in other cases through threaded and doped joints. Otherwise stated, once the obstruction has been removed, it is often necessary to have a professional-type reinstallation to prevent a later leaking of the connections. The present invention eliminates this requirement.

BRIEF DESCRIPTION OF THE PRESENT INVENTION

The present invention, as will become apparent from the following description and explanation, is related to an easily installed connector which is particularly useful in a broad variety of plumbing systems, both from the viewpoint of reducing the cost of initial installation of the plumbing system and of later making disconnect, repairs and removal of obstructions simple for the homeowner. Reconnection of the plumbing system is possible without costly professional assistance.

In the initial installation, the connector is of a construction that makes it possible to accommodate a broad range of pipe sizes, all with the same basic connector. This is made possible by the mode of construction of the end portions of the connector. In addition to a segmented and frangible end with a number of break-off sections provided, the opposed end portion internal diameter has an inwardly tapered wall thickness such that a different diameter pipe can be introduced to achieve a snug fit at whatever length its diameter is accommodated. This will be better shown and clarified in the drawings hereinafter. Since the material of the connector is both flexible and transparent, the first introduction of the pipe end into the end portion will give rise to a visible ring or depression which indicates the desired location in which break-off may be made of the one or more segmented excess end sections to provide a close and neat fit of the connector and mating pipe. Thus, sizing and connection are achieved simply without specialized skill or tools. The final attachement by the clamp is simply and quickly accomplished and in such manner as to allow for quick disconnect when and if that becomes later necessary.

BRIEF DESCRIPTION OF THE DRAWINGS

The present invention will now be described with reference to the following description and the drawings in which like numerals are used to refer to like parts where they may appear throughout the several views, and wherein.

DETAILED DESCRIPTION OF THE PREFERRED EMBODIMENT

Figure 1:
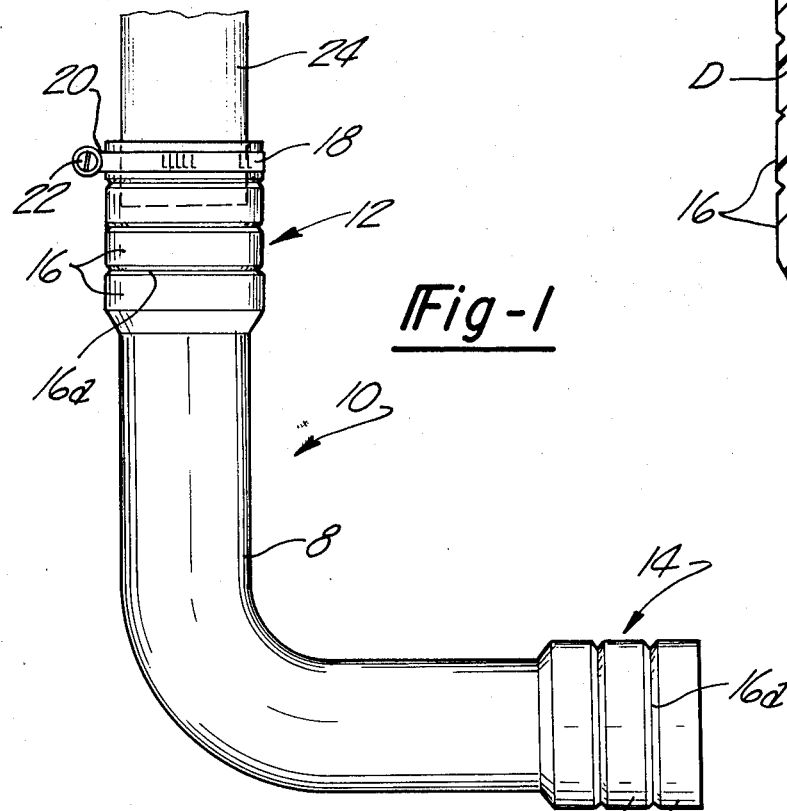
FIG. 1 is a front elevational view of the connector according to the present invention showing the pipe end portions.

As shown in FIG. 1, the connector 10 includes a central arcuate bend portion 8 which may be straight or bent at a 90° angle as shown, or in a range of arcuate bends ranging from 45° to 90° to 120°, for example. The connector 10 may thus be precast in a relatively small number of arcuate shapes. Assembly on the building site can be made without further modification of the several basic connector bend configurations. The connector 10 may be formed of a high density polyethylene material.

An alternative substance from which the connector 10 might be constructed or cast is polyprophylene copolymer which while it may not be available in clear, substantially transparent version, may be such that it will admit light to a sufficient degree to enable one to determine whether or not the bend portion 8 is becoming filled with sediment, grease, dirt or scale so that it is in condition requiring removal and cleaning or replacement. As is well known in the art, both of the above described substances are resistant to the temperature of the water passing through them over a range of approximately 190°–240°, thus safely allowing for the passage of any typical waste liquid passing through plumbing installations.

The connector 10 includes a pair of end portions 12 and 14. Each end portion includes a plurality of segmented sections 16 fabricated along precast or scribed frangible lines 16a. This permits breaking off the end portions 12 or 14 to a desired length to match and make a suitable connection to the two pipes being coupled together. While the FIG. 1 embodiment is shown as being a right angle elbow connector, the invention is not limited to any particular angular shape.

Also shown in FIG. 1 is a C-clamp type attachment means identified by the numeral 18. The clamp 18 includes at its left side a pair of upstanding portions 20 which are joined and fastened together through a threaded fastener such as a screw 22. This type of attachment allows for ready connect and disconnect of the connector 10 relative to either of the pipes such as pipe 24 shown at the upper left hand end of the drawing.

Figure 2:
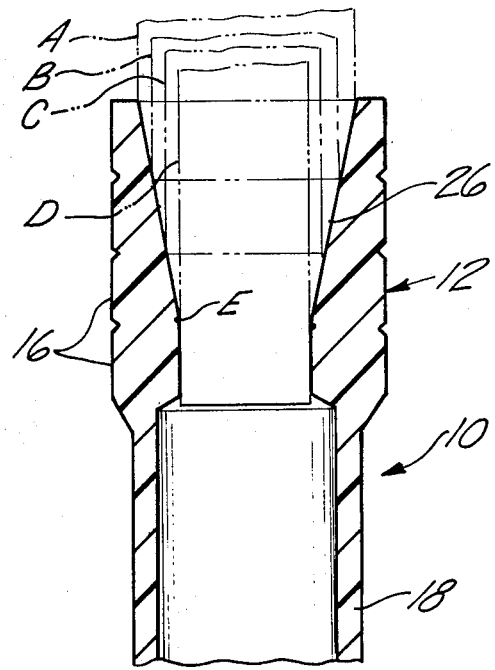
FIG. 2 is an enlarged cross-sectional view with parts broken away to show the internal construction of a pipe being sized and fitted to the connector.

The FIG. 2 drawing clarifies the internal construction of the upper one of the two end portions 12. It will be seen that the end portion 12 includes a plurality of similarly sized segmental sections 16. The internal diameter of the end portion 12 includes an inwardly converging tapered internal diameter 26. This tapered internal diameter is substantially coextensive in length with the combined length of the segmented sections 16. The tapered internal diameter 26 is capable of handling a broad range of pipe sizes which are illustrated by four different sized pipes A–D. Since the connector 10 is formed of a readily deflectible plastictype material, when the pipe such as pipe D is introduced into the end of the end portion 12 it will finally seat at some point along the length of the tapered internal diameter and at that portion will leave a noticeable ridge or ring E which will indicate the length to which it has penetrated the end portion 12. To achieve a close and tight connection, it is desirable that the clamp, such as C-clamp 18, is attached about one of the particular segmented sections 16 which is formed above the end of the pipe being inserted in accordance with its size. Thus for pipe D, for example, the best fit would be made by attaching the clamp 18 about the second lower section 16.

Figure 3:
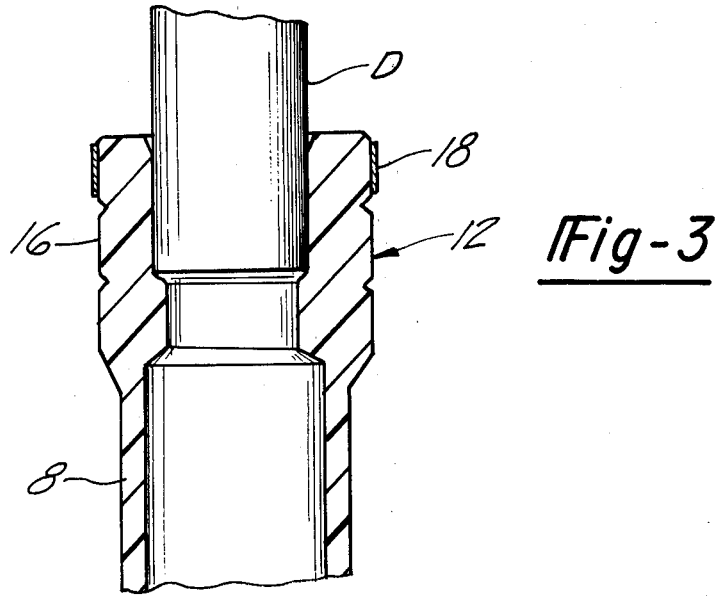
FIG. 3 is a cross-sectional view substantially similar to FIG. 2 and illustrating the final step in which an excess segmented section has been broken off and removed after prefitting of the pipe.

As shown in FIG. 3, break-off of the upper section or sections 16 is made after inserting in place the C-clamp 18 and tightening it. Thus the connection finally achieved is one in which there is a slight sealing distortion of the remaining and surrounding sections 16 into confined engagement with the periphery of the pipe.

It will thus become apparent that I have provided an improved flexible-type connector which is both novel and considerbly advanced over the prior art with respect to its initial installation in a plumbing system and with respect to its resistance to corrosion and galvanic wear.

The present invention represents a still further advancement with respect to the manner in which it may be visually examined to determine whether a plugged condition exists. Removal and reassembly can be done without requiring complicated reconnection of the pipe joints.

The present invention thus achieves a meritorious advance with lower cost of initial plumbing installation. It also simplifies and lowers the cost of maintenance over a long period of use.

What is claimed is:

1. A flexible pipe connector for use in coupling a pair of transaxial pipes, comprising:
   an arcuately curved pipe bend portion having a pair of end portions, each sized to receive a different one of the pair of pipes;
   each of said end portions having a plurality of segmented and frangible end section each of like outside diameter;
   a pair of clamps, each engageable over different ones of said segmented end sections for attaching each respective end portion about its opposed pipe; and
   a threaded fastener engageable with opposed extending lips from each of said clamps for tightening each clamp about the associated segmented end portion and for thus holding the bend portion tightly attached to the pipes;
   said end portions further having a tapered internal diameter extending inwardly over a length of said end portion substantially equal to the combined length of the segmented end sections.

2. The combination as set forth in claim 1 wherein said bend portion and said end portions are all constructed of a high density polyethylene substance for admitting light through their walls to allow a visible inspection of the condition of the pipe bend preparatory to removal for cleaning.

3. The combination as set forth in claim 1 wherein each of said end portions is readily and separately detachable from its opposed pipe and deflectible over a substantial distance, whereby a water hose or like flexible cleaning instrument may be inserted for removing and dislodging clogging material from the bend portion.

4. A flexible pipe connector for use in coupling a pair of pipes, comprising:
   an arcuately curved pipe bend portion of a high density polyethylene substance for admitting light therethrough and having a pair of end portions, each sized to receive a corresponding one of the pair of pipes, each of said end portions further having a plurality of segmented and frangible end sections of like outside diameter;

a pair of clamps engageable over selected ones of said segmented end sections for attaching each respective end portion about its opposed pipe end; and a fastener means operatively associated with each of said clamps for tightening it about the associated end portion and for holding said end portion tightly attached to its associated pipe;

said end portions further each having an inwardly converging tapered internal diameter extending over a length of said end portion substantially equal to the combined length of the segmented end sections.

* * * * *